(12) United States Patent
Yokoyama et al.

(10) Patent No.: US 8,390,542 B2
(45) Date of Patent: Mar. 5, 2013

(54) APPARATUS, METHOD, AND PROGRAM FOR PROCESSING IMAGE

(75) Inventors: Kazuki Yokoyama, Kanagawa (JP);
Kazuhiko Ueda, Kanagawa (JP);
Mitsuyasu Asano, Tokyo (JP); Tetsuji Inada, Tokyo (JP)

(73) Assignee: Sony Corporation, Tokyo (JP)

( * ) Notice: Subject to any disclaimer, the term of this patent is extended or adjusted under 35 U.S.C. 154(b) by 1254 days.

(21) Appl. No.: 11/108,961

(22) Filed: Apr. 19, 2005

(65) Prior Publication Data

US 2005/0237432 A1    Oct. 27, 2005

(30) Foreign Application Priority Data

Apr. 21, 2004    (JP) ................ P2004-125537

(51) Int. Cl.
G09G 3/30 (2006.01)
G09G 5/00 (2006.01)
G09G 3/12 (2006.01)
G06F 3/038 (2006.01)

(52) U.S. Cl. .............. 345/77; 345/78; 345/76; 345/204; 345/36; 345/45

(58) Field of Classification Search ............ 345/20, 345/36, 45, 63, 76, 204, 589–605; 315/169.3, 315/383
See application file for complete search history.

(56) References Cited

U.S. PATENT DOCUMENTS

| 4,829,381 | A | 5/1989 | Song et al. |
| 4,975,773 | A | 12/1990 | Rabii |
| 5,003,394 | A | 3/1991 | Lagoni |
| 5,708,451 | A * | 1/1998 | Baldi ............. 345/75.2 |
| 6,049,626 | A | 4/2000 | Kim |
| 6,597,329 | B1 * | 7/2003 | Moss ............. 345/55 |
| 6,801,220 | B2 * | 10/2004 | Greier et al. ........ 345/694 |
| 2001/0035850 | A1 * | 11/2001 | Okamoto et al. ....... 345/77 |
| 2003/0058235 | A1 * | 3/2003 | Moon ............. 345/212 |
| 2004/0008206 | A1 * | 1/2004 | Tognoni et al. ........ 345/589 |

FOREIGN PATENT DOCUMENTS

| EP | 0 390 179 | 10/1990 |
| EP | 0 414 183 A2 | 2/1991 |
| JP | 2000-181434 | 6/2000 |
| JP | 2003-131623 | 5/2003 |

* cited by examiner

*Primary Examiner* — Srilakshmi K Kumar
(74) *Attorney, Agent, or Firm* — Finnegan, Henderson, Farabow, Garrett & Dunner, L.L.P.

(57) ABSTRACT

An image-processing apparatus includes an average-luminance calculating unit that calculates the average luminance of pixels in an image, a correction-factor calculating unit that calculates a correction factor corresponding to the luminance of each pixel, a correction-value calculating unit that calculates a correction value corresponding to each pixel based on the average luminance and the correction factor, and an adding unit that adds the correction value to the luminance. The correction-value calculating unit sets the correction value to a maximum value of zero when the luminance has a maximum value.

20 Claims, 9 Drawing Sheets

Prior Art

Prior Art

APPARATUS, METHOD, AND PROGRAM FOR PROCESSING IMAGE

BACKGROUND OF THE INVENTION

1. Field of the Invention

The present invention relates to apparatuses, methods, and programs for processing images, and in particular, relates to apparatuses, methods, and programs for processing images suitable for enhancing the contrast of images appearing on displays having a fixed luminance dynamic range from a white level to a black level, for example, liquid crystal displays. The white level is a luminance level when white is displayed, and the black level is a luminance level when black is displayed.

2. Description of the Related Art

Direct current (DC) transmission rate correction is known as a method for enhancing contrast of the image when an overall image of, for example, television is bright. In DC transmission rate correction, luminance signals, out of input image signals (referred to as input signals hereinafter), are averaged. Then, a predetermined value depending on this average value (referred to as average luminance hereinafter) is uniformly subtracted from the luminance of each pixel. This method is disclosed in, for example, Japanese Unexamined Patent Application Publication No. 2003-131623, especially paragraph 15 and FIG. 4.

In DC transmission rate correction, for example, input luminance signals having luminance levels shown in FIG. 1 are corrected and output as output luminance signals having luminance levels shown in FIG. 2. In this correction, the luminance levels of the input luminance signals are uniformly reduced regardless of the individual levels, as shown in FIG. 2. In FIGS. 1 and 2, the abscissa indicates time t, and the ordinate indicates the luminance level. A white level and a black level are indicated on the ordinate.

Luminance signals having luminance levels that are relatively low but higher than the black level in FIG. 1 are displayed as black by correction, as shown in FIG. 2. Thus, the darkness in an image is emphasized.

The output luminance signals in FIG. 2 shows that high luminance levels for displaying white in FIG. 1 are also reduced in DC transmission rate correction. However, as shown in FIG. 3, in a display having a variable luminance dynamic range from a white level to a black level, such as a cathode ray tube (CRT), the white level can be adjusted independently of DC transmission rate correction. Thus, intended white can be displayed from luminance signals for white.

SUMMARY OF THE INVENTION

However, for displays having a fixed luminance dynamic range from a white level to a black level, for example, liquid crystal displays, the black level cannot be reduced without reducing the white level in known DC transmission rate correction, and luminance levels of input luminance signals are uniformly reduced. Thus, intended white cannot be displayed from luminance signals for white, so that an overall image is disadvantageously darkened.

In view of this problem, it is an object of the present invention to provide an image-processing apparatus that enhances contrast in images without reducing a white level of a display.

An image-processing apparatus according to the present invention includes an average-luminance calculating unit that calculates the average luminance of pixels in an image; a correction-factor calculating unit that calculates a correction factor corresponding to the luminance of each pixel; a correction-value calculating unit that calculates a correction value corresponding to each pixel, based on the average luminance and the correction factor, the correction-value calculating unit setting the correction value to a maximum value of zero when the luminance has a maximum value; and an adding unit that adds the correction value to the luminance.

Preferably, the correction-factor calculating unit sets the correction factor to a maximum value of zero when the luminance has a maximum value, and sets the correction factor to a negative minimum value when the luminance has a minimum value.

Preferably, the correction-value calculating unit calculates the correction value in proportion to the average luminance and the correction factor.

Preferably, the correction-factor calculating unit calculates the correction factor using a look-up table or a function.

An image-processing method according to the present invention includes an average-luminance calculating step of calculating the average luminance of pixels in an image; a correction-factor calculating step of calculating a correction factor corresponding to the luminance of each pixel; a correction-value calculating step of calculating a correction value corresponding to each pixel, based on the average luminance and the correction factor, the correction-value calculating step setting the correction value to a maximum value of zero when the luminance has a maximum value; and an adding step of adding the correction value to the luminance.

A computer-executable program according to the present invention includes an average-luminance calculating step of calculating the average luminance of pixels in an image; a correction-factor calculating step of calculating a correction factor corresponding to the luminance of each pixel; a correction-value calculating step of calculating a correction value corresponding to each pixel, based on the average luminance and the correction factor, the correction-value calculating step setting the correction value to a maximum value of zero when the luminance has a maximum value; and an adding step of adding the correction value to the luminance.

In the apparatus, the method, and the program according to the present invention for processing images, the correction factor corresponding to the luminance of each pixel is calculated. The correction value corresponding to each pixel is calculated, based on the average luminance and the correction factor. Then, the correction value is added to the luminance. When the luminance has a maximum value, the correction value is set to a maximum value of zero.

According to the present invention, contrast in images can be enhanced without reducing a white level of a display.

DESCRIPTION OF THE PREFERRED EMBODIMENTS

Figure 4:
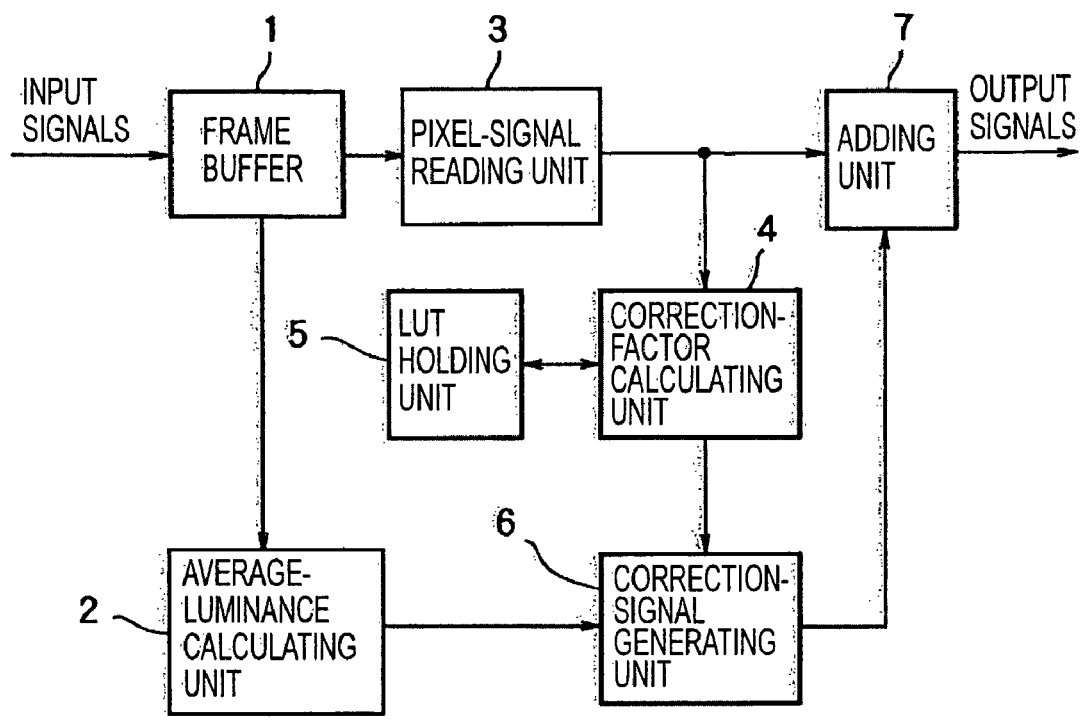
FIG. 4 is a block diagram illustrating the structure of an image-processing apparatus according to an embodiment of the present invention.

FIG. 4 is a block diagram illustrating the structure of an image-processing apparatus according to an embodiment of the present invention. This image-processing apparatus can be included in displays having a fixed luminance dynamic range from a white level to a black level, for example, liquid crystal displays.

As shown in FIG. 4, the image-processing apparatus includes a frame buffer 1, an average-luminance calculating unit 2, a pixel-signal reading unit 3, a correction-factor calculating unit 4, a look-up-table (LUT) holding unit 5, a correction-signal generating unit 6 (also referred to as a correction-value calculating unit), and an adding unit 7. The frame buffer 1 stores input image signals for one image (one field image or one frame image) of, for example, television. The average-luminance calculating unit 2 calculates the average luminance Av of luminance signals out of the input image signals of one image stored in the frame buffer 1 and outputs the average luminance Av to the correction-signal generating unit 6. Alternatively, the average-luminance calculating unit 2 may calculate the average luminance Av of luminance signals of two or more images.

The pixel-signal reading unit 3 reads out image signals of one image stored in the frame buffer 1 pixel by pixel and outputs the image signals to the correction-factor calculating unit 4 and the adding unit 7. The LUT holding unit 5 holds a look-up table (LUT). The correction-factor calculating unit 4 calculates the correction factor Kp that is zero or negative depending on the luminance level P of a luminance signal of each pixel from the pixel-signal reading unit 3 with reference to the LUT and outputs the correction factor Kp to the correction-signal generating unit 6. Alternatively, the correction-factor calculating unit 4 may calculate the correction factor Kp from the luminance level P using a function, instead of the LUT.

Figure 5:
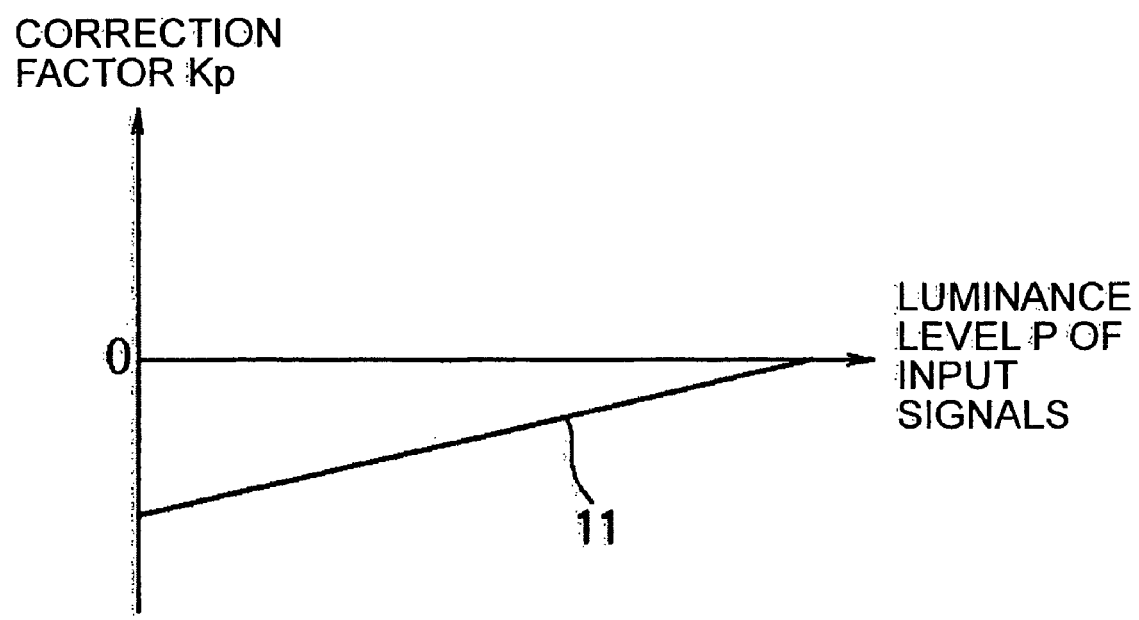
FIG. 5 illustrates a typical relationship between the luminance level and the correction factor.

The LUT stores data of the relationship between the luminance level P and the correction factor Kp. FIG. 5 illustrates a typical relationship between the luminance level P and the correction factor Kp. As shown by a straight line 11 in FIG. 5, when the luminance level P is minimum, the correction factor Kp is minimum and negative. When the luminance level P is maximum, the correction factor Kp is maximum at zero. In FIG. 5, the relationship between the luminance level P and the correction factor Kp is linear, as shown by the straight line 11. However, the relationship may be non-linear.

According to the following equation (1), the correction-signal generating unit 6 generates a correction signal C, based on the correction factor Kp from the correction-factor calculating unit 4, the average luminance Av from the average-luminance calculating unit 2, and the absolute white level Wl. Then, the correction-signal generating unit 6 outputs the correction signal C to the adding unit 7:

$$C = Kp(Av/Wl) \quad (1)$$

where Wl is a predetermined white level of a display, for example, a liquid crystal display, including the image-processing apparatus according to the present invention.

The adding unit 7 adds a corresponding correction signal C from the correction-signal generating unit 6 to the luminance signal of each pixel from the pixel-signal reading unit 3 to produce an output luminance signal.

Figure 6:
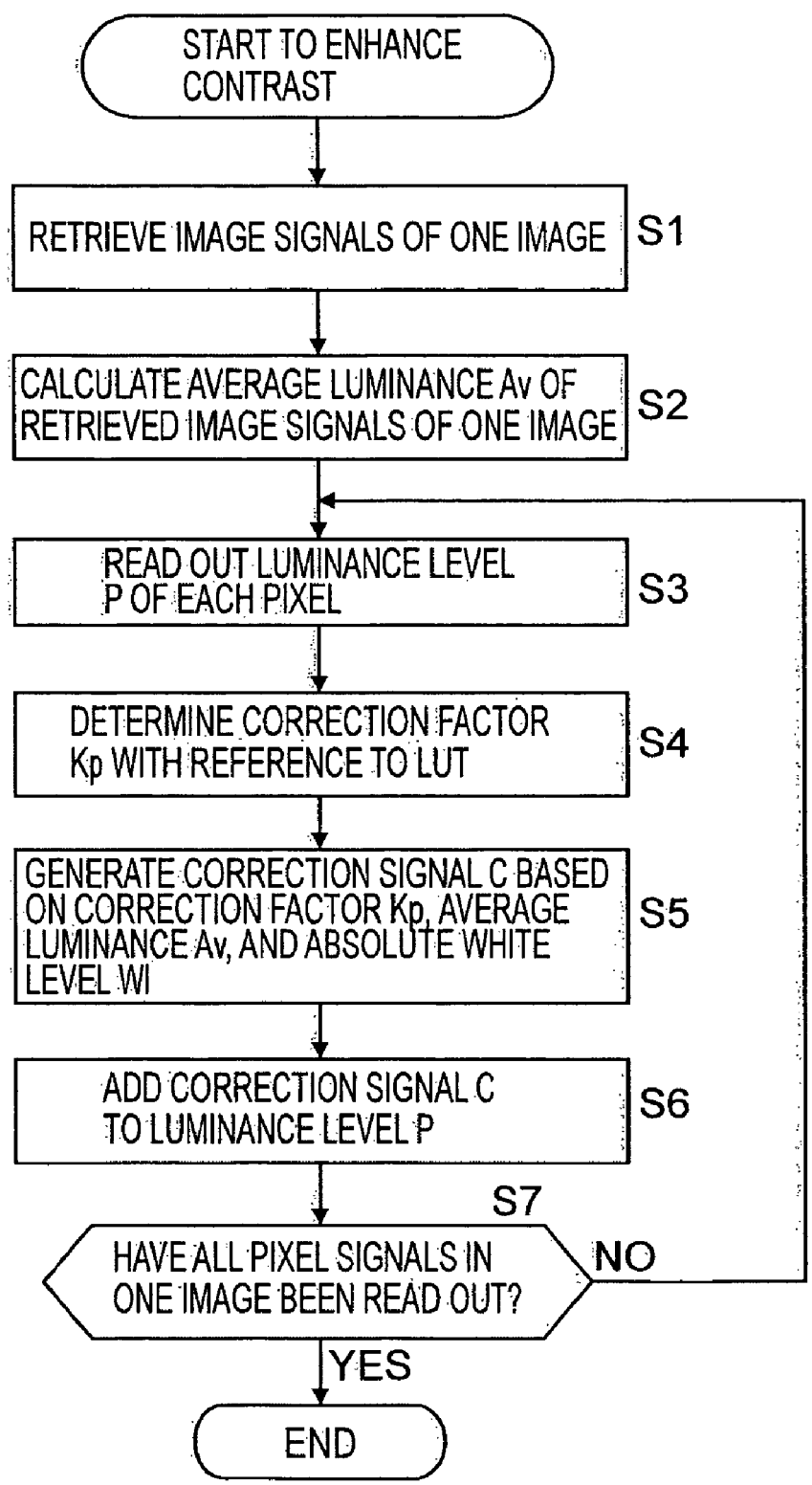
FIG. 6 is a flowchart illustrating contrast-enhancing process.

The process of enhancing the contrast in the image-processing apparatus will now be described with reference to a flowchart in FIG. 6.

An image-processing method according to an embodiment of the present invention includes an average-luminance calculating step (step S2) of calculating the average luminance of pixels in an image; a correction-factor calculating step (step S4) of calculating a correction factor corresponding to the luminance of each pixel; a correction-value calculating step (step S5) of calculating a correction value corresponding to each pixel, based on the average luminance and the correction factor, the correction-value calculating step setting the correction value to a maximum value of zero when the luminance has a maximum value; and an adding step (step S6) of adding the correction value to the luminance.

In step S1, the frame buffer 1 stores input image signals of one image. In step S2, the average-luminance calculating unit 2 retrieves luminance signals from the image signals of one image stored in the frame buffer 1 and calculates the average luminance Av of the luminance signals to output the average luminance Av to the correction-signal generating unit 6.

In step S3, the pixel-signal reading unit 3 reads out image signals of each pixel in, for example, the raster scanning sequence, from the image signals of one image stored in the frame buffer 1, and outputs the image signals to the correction-factor calculating unit 4 and the adding unit 7. In step S4, the correction-factor calculating unit 4 calculates the correction factor Kp depending on the luminance level P of a luminance signal of each pixel from the pixel-signal reading unit 3 with reference to the LUT in the LUT holding unit 5 and outputs the correction factor Kp to the correction-signal generating unit 6.

In step S5, according to equation (1), the correction-signal generating unit 6 generates a correction signal C, based on the correction factor Kp from the correction-factor calculating unit 4, the average luminance Av from the average-luminance calculating unit 2, and the absolute white level Wl. Then, the correction-signal generating unit 6 outputs the correction signal C to the adding unit 7. In step S6, the adding unit 7 adds a corresponding correction signal C from the correction-signal generating unit 6 to the luminance level P of the luminance signal of each pixel from the pixel-signal reading unit 3 to produce an output luminance signal supplied to the subsequent stage.

As is apparent from FIG. 5 and equation (1), when the average luminance Av of the input luminance signals is high, the absolute value of the correction signal C is also high. When the luminance level P of the input luminance signal of each pixel is low, the value of the correction signal C is low, that is, the absolute value of the correction signal C is high because the value of the correction signal C is negative. When the luminance level P is maximum, the value of the correction signal C is maximum at zero.

Thus, for pixels detecting input luminance signals having relatively low luminance levels P, reductions in luminance levels of output luminance signals are relatively large. For pixels detecting input luminance signals having relatively high luminance levels P, reductions in luminance levels of output luminance signals are relatively small. For pixels detecting input luminance signals having the maximum luminance level P, output luminance signals have the same luminance level P as the input luminance signals.

Figure 7:
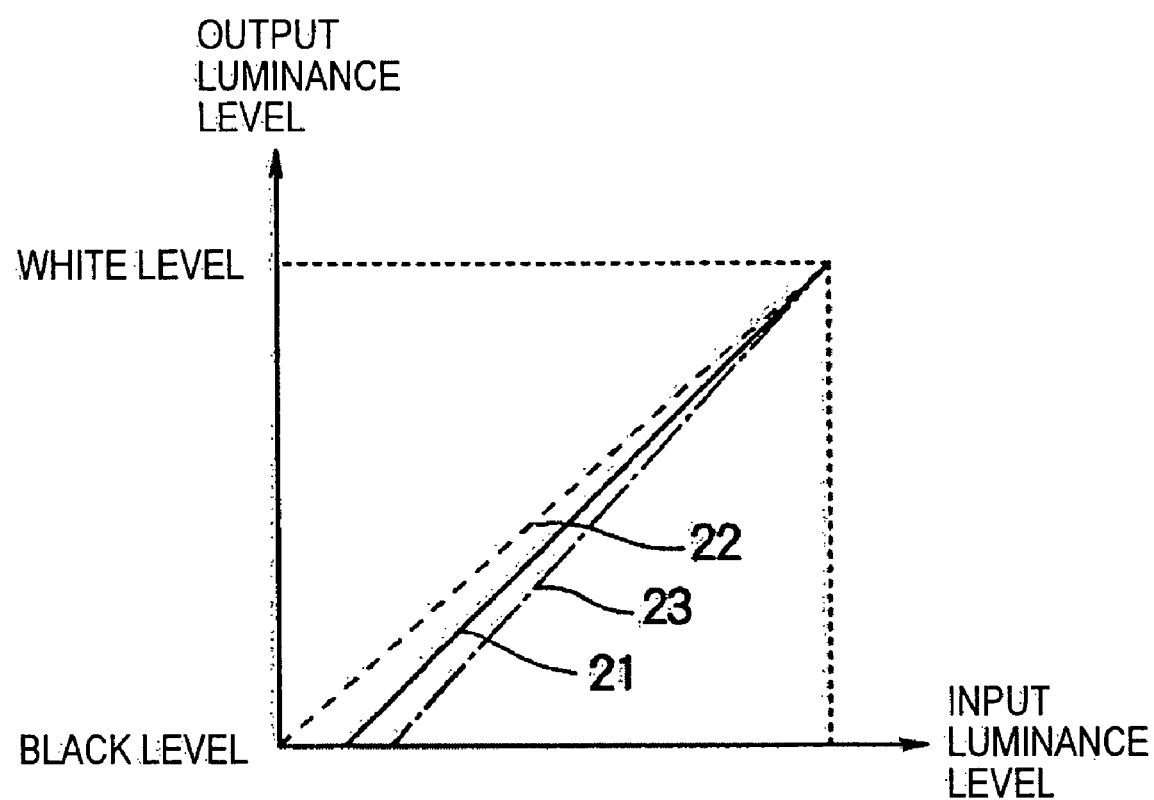
FIG. 7 illustrates the relationship between the input luminance level before the contrast-enhancing process and the output luminance level after the contrast-enhancing process.

FIG. 7 illustrates the relationship between the luminance level (abscissa) of an input luminance signal before the contrast-enhancing process and the luminance level (ordinate) of the corresponding output luminance signal after this process. When the average luminance Av is a predetermined reference value, this relationship is indicated by a straight line 21. When the average luminance Av is less than the predetermined reference value, the relationship is indicated by a straight line 22 that has a lower gradient than the straight line 21. In contrast, when the average luminance Av is more than the predetermined reference value, the relationship is indicated by a straight line 23 that has a higher gradient than the straight line 21. As is apparent from FIG. 7, the maximum luminance level of the input luminance signal is the same as that of the output luminance signal regardless of the average luminance Av.

Accordingly, the brighter the overall image is, that is, the higher the average luminance Av is, the darker parts of the image having low luminance levels are displayed by the above process of enhancing the contrast of the image.

In step S7, the pixel-signal reading unit 3 determines whether all the image signals of one image stored in the frame buffer 1 have been read out. When the pixel-signal reading unit 3 has not read out some pixels, the process goes back to step S3 to read out the next pixel. Steps S3 to S7 are repeated until all the image signals of one image stored in the frame buffer 1 are read out.

Figure 1:
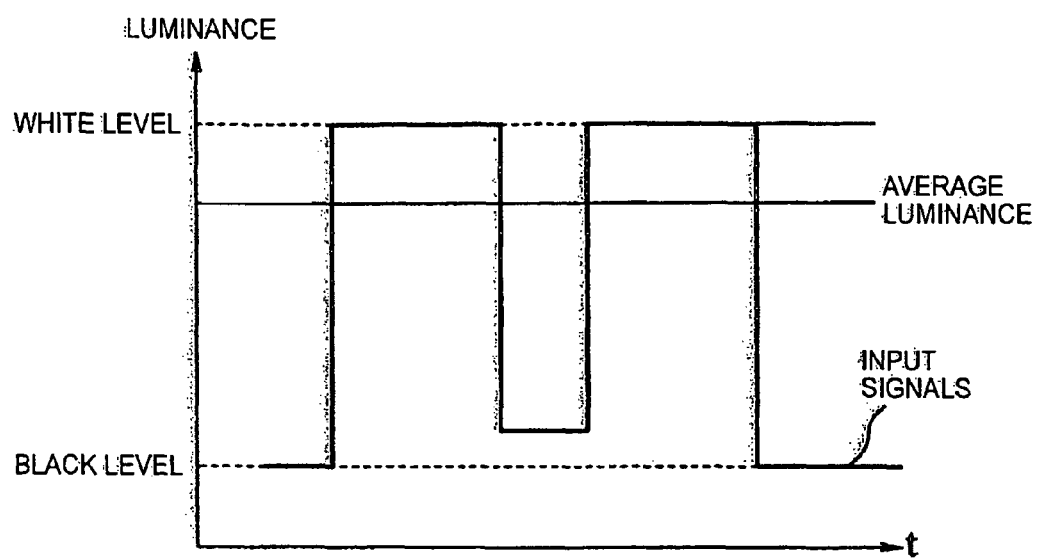
FIG. 1 illustrates typical luminance levels of input luminance signals.
Figure 2:
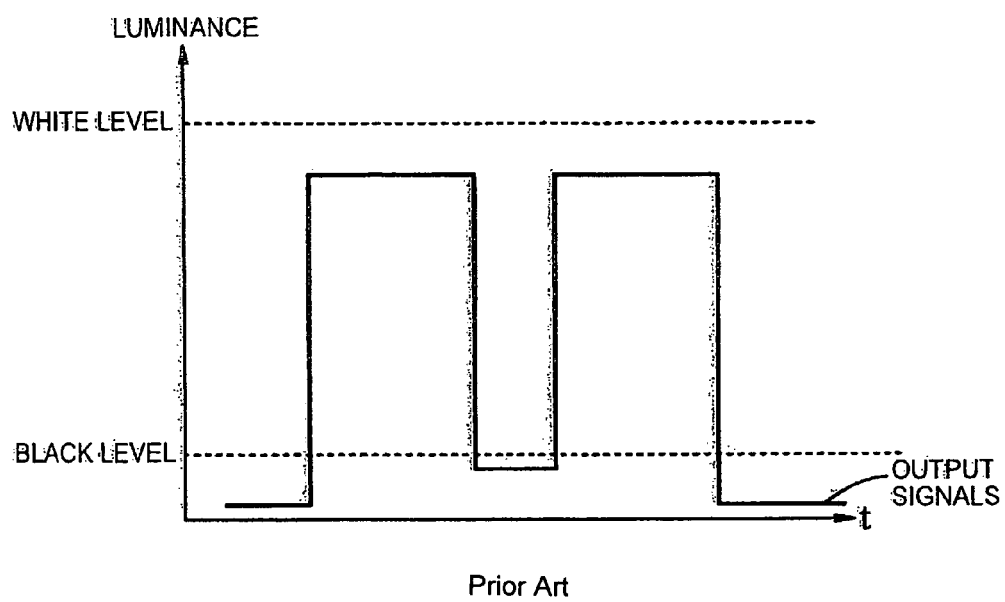
FIG. 2 illustrates output luminance signals obtained by correcting the input luminance signals shown in FIG. 1 in DC transmission rate correction.
Figure 3:
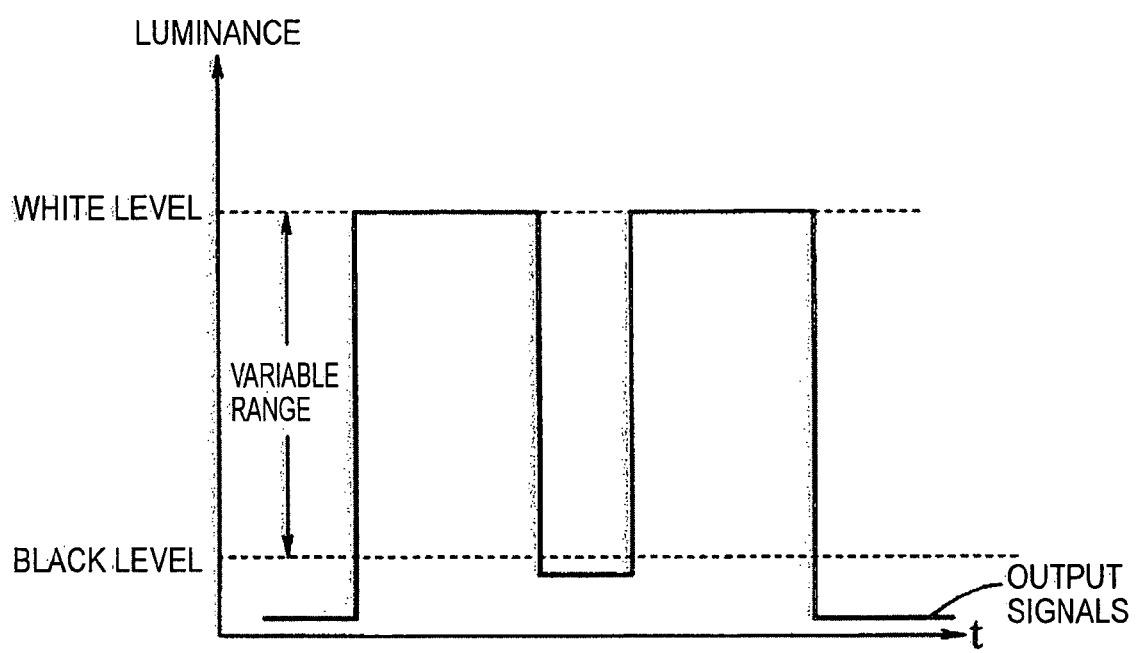
FIG. 3 illustrates output luminance signals after DC transmission rate correction and white level adjustment of the input luminance signals shown in FIG. 1.
Figure 8:
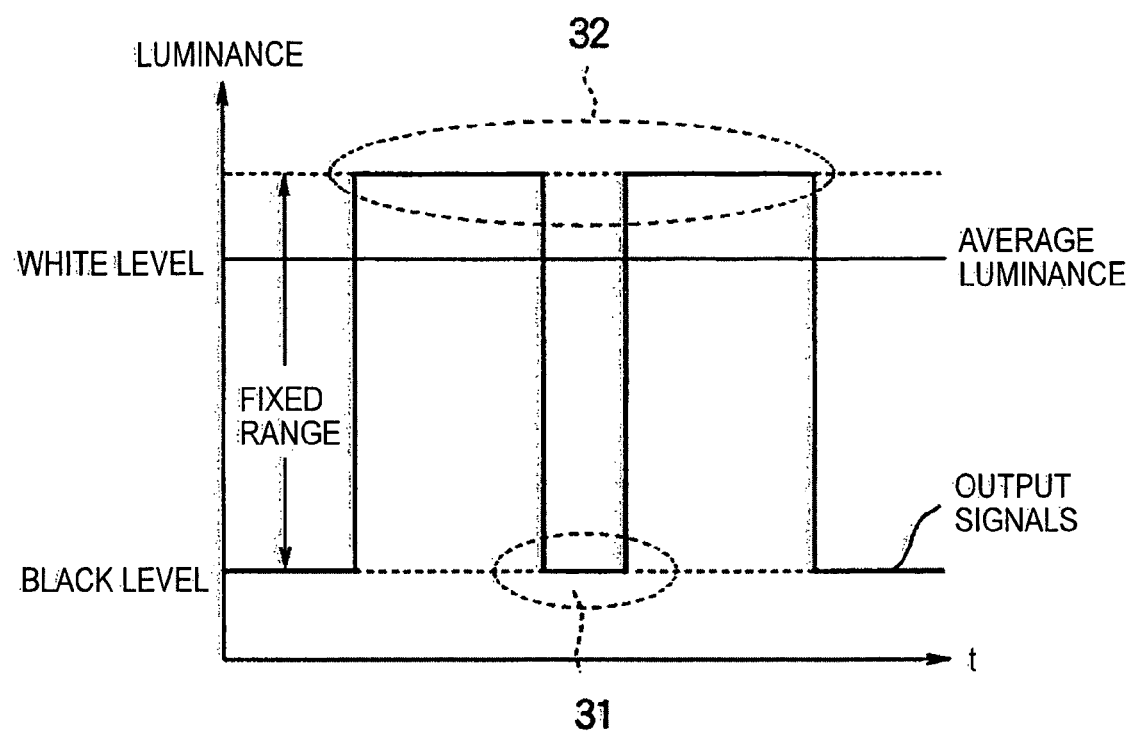
FIG. 8 illustrates output luminance signals through the contrast-enhancing process of the input luminance signals shown in FIG. 1.

FIG. 8 illustrates the luminance levels of the output luminance signals obtained by the above contrast-enhancing process of the input luminance signals shown in FIG. 1. The abscissa indicates time t, and the ordinate indicates the luminance level of the output luminance signal. The white level and the black level of a display including the image-processing apparatus according to the present invention, for example, a liquid crystal display, are fixed on the ordinate.

As is apparent from a comparison between FIG. 1 and FIG. 8, luminance signals (corresponding to output luminance signals indicated by a dotted circle 31 in FIG. 8) having luminance levels that are relatively low but higher than the black level in FIG. 1 are corrected and displayed as black, as shown in FIG. 8. Thus, the darkness in an image is emphasized. In contrast, luminance signals (corresponding to output luminance signals indicated by a dotted circle 32 in FIG. 8) having a maximum luminance level for displaying white in FIG. 1 are not corrected and are output as the output luminance signals for displaying white, as shown in FIG. 8. Thus, the contrast of the image is enhanced without losing the brightness of the overall image.

The contrast-enhancing process described above can be carried out with either hardware or software. When this process is carried out with software, programs are installed from a recording medium in, for example, dedicated-purpose computers or general-purpose personal computers having a typical structure shown in FIG. 9 for executing a variety of application programs.

Figure 9:
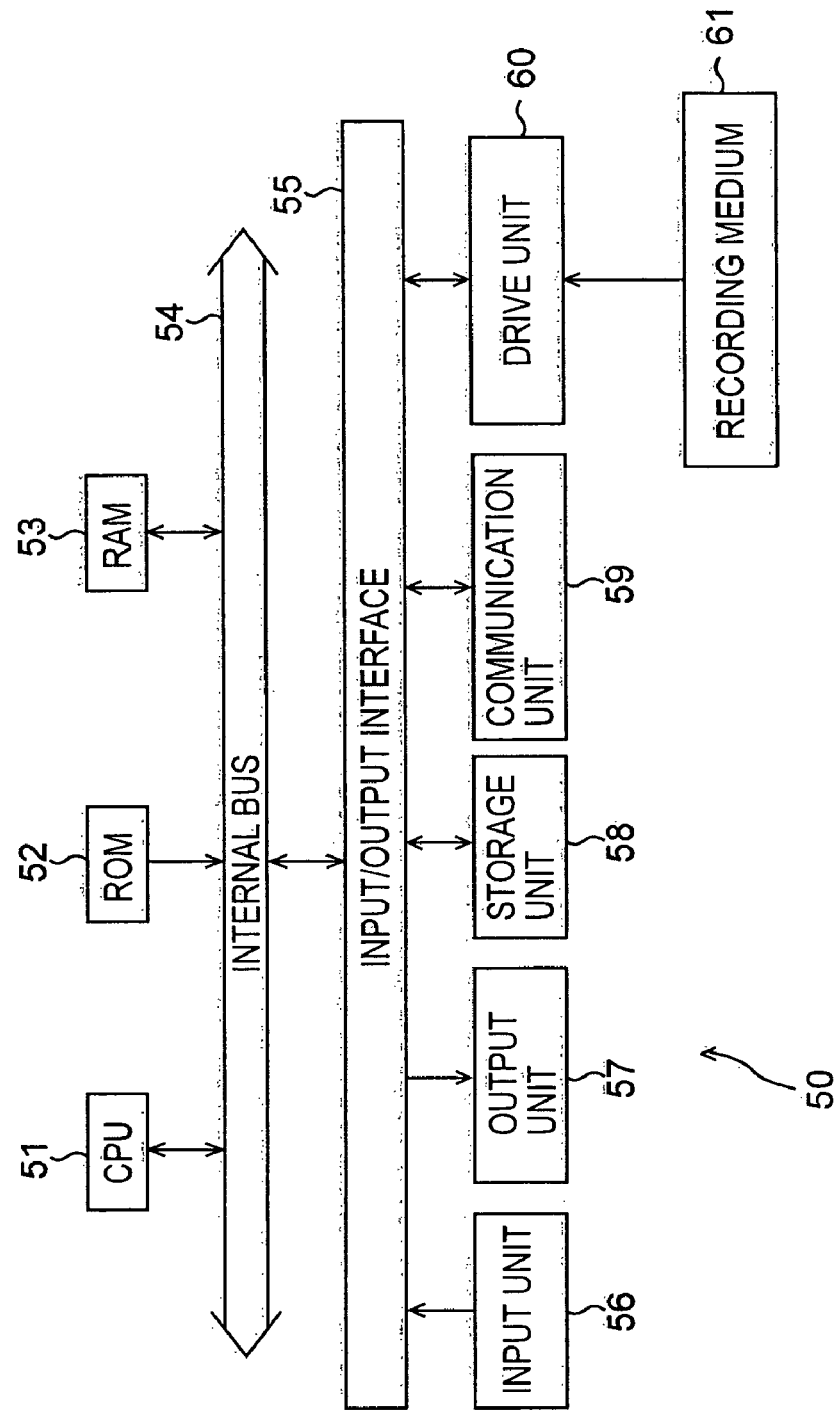
FIG. 9 is a block diagram illustrating the structure of a personal computer according to an embodiment of the present invention.

In FIG. 9, a personal computer 50 includes a central processing unit (CPU) 51. An input/output (I/O) interface 55 connects to the CPU 51 through an internal bus 54. A read only memory (ROM) 52 and a random access memory (RAM) 53 connect to the bus 54.

The following elements connect to the I/O interface 55: an input unit 56 including input devices for inputting user commands, for example, a keyboard, a mouse, and a remote controller; an output unit 57 including, for example, a display; a storage unit 58 including, for example, a hard disk drive for storing programs, image signals, and the like; a communication unit 59 including a local area network (LAN) adapter for communicating through networks such as the Internet; and a drive unit 60. A recording medium 61 is, for example, a magnetic disk, an optical disk, a magneto-optical disk, or a semiconductor memory. The drive unit 60 reads or writes data from or to the recording medium 61.

For example, programs for performing the contrast-enhancing process on the personal computer 50 are packaged in the recording medium 61 and are distributed to the personal computer 50 to be installed in a hard disk drive in the storage unit 58 through the drive unit 60. The programs stored in the storage unit 58 are loaded into the RAM 53 to be executed in response to an instruction from the CPU 51, corresponding to a user command from the input unit 56.

The above-described steps in the program are not necessarily executed in a chronological order described above, but may be executed in parallel or separately.

What is claimed is:

1. An image-processing apparatus, which processes an image displayed on a display having a fixed luminance dynamic range, comprising:
    an average-luminance calculating unit that calculates the average luminance of pixels in an image;
    a correction-factor calculating unit that calculates, for each pixel in the image, a correction factor corresponding to the luminance of the pixel, wherein the correction factor is for reducing the luminance of the pixel and the absolute value of the correction factor decreases as the luminance of the pixel increases;
    a correction-value calculating unit comprising a processor and a memory that calculates, for each pixel in the image, a correction value corresponding to the pixel by multiplying the correction factor by the average luminance and dividing by a predetermined white level for the display; and
    an adding unit that adds the correction value to the luminance.

2. The image-processing apparatus according to claim 1, wherein the correction-factor calculating unit sets the correction factor to zero when the luminance has a maximum value, and sets the correction factor to a negative value when the luminance has a minimum value.

3. The image-processing apparatus according to claim 1, wherein the correction-value calculating unit calculates the correction value in proportion to the average luminance and the correction factor.

4. The image-processing apparatus according to claim 1, wherein the correction-factor calculating unit calculates the correction factor using a look-up table or a function.

5. The image-processing apparatus according to claim 1, wherein the correction-value calculating unit sets the correction value to a maximum value of zero when the luminance has a maximum value.

6. An image-processing method, which processes an image displayed on a display having a fixed luminance dynamic range, comprising:
    calculating, by a computer, the average luminance of pixels in an image;
    calculating, by the computer, for each pixel in the image, a correction factor corresponding to the luminance of the pixel, wherein the correction factor is for reducing the luminance of the pixel and the absolute value of the correction factor decreases as the luminance of the pixel increases;
    calculating, by the computer, for each pixel in the image, a correction value corresponding to the pixel by multiplying the correction factor by the average luminance and dividing by a predetermined white level for the display; and adding, by the computer, the correction value to the luminance.

7. The image-processing method according to claim 6, further comprising:

setting the correction factor to zero when the luminance has a maximum value, and setting the correction factor to a negative value when the luminance has a minimum value.

8. The image-processing method according to claim 6, further comprising calculating the correction value in proportion to the average luminance and the correction factor.

9. The image-processing method according to claim 6, further comprising calculating the correction factor using a look-up table or a function.

10. The image-processing method according to claim 6, further comprising setting the correction value to a maximum value of zero when the luminance has a maximum value.

11. A computer program product embodied on a tangible, non-transitory computer readable medium for allowing a computer to execute a method, comprising the computer-implemented steps of:

calculating the average luminance of pixels in an image;

calculating, for each pixel in the image, a correction factor corresponding to the luminance of the pixel, wherein the correction factor is for reducing the luminance of the pixel and the absolute value of the correction factor decreases as the luminance of the pixel increases;

calculating, for each pixel in the image, a correction value corresponding to the pixel by multiplying the correction factor by the average luminance and dividing by a predetermined white level for a display having a fixed luminance dynamic range; and adding the correction value to the luminance.

12. The computer program product according to claim 11, further comprising the computer-implement steps of:

setting the correction factor to zero when the luminance has a maximum value, and setting the correction factor to a negative value when the luminance has a minimum value.

13. The computer program product according to claim 11, further comprising the computer-implement steps of:

calculating the correction value in proportion to the average luminance and the correction factor.

14. The computer program product according to claim 11, further comprising the computer-implement steps of:

calculating the correction factor using a look-up table or function.

15. The computer program product according to claim 11, further comprising the computer-implement steps of:

setting the correction value to a maximum value of zero when the luminance has a maximum value.

16. A program tangibly embodied in a non-transitory computer readable medium for causing, when executed by a processor, a computer to execute a method, the method comprising:

calculating the average luminance of pixels in an image;

calculating, for each pixel in the image, a correction factor corresponding to the luminance of the pixel, wherein the correction factor is for reducing the luminance of the pixel and the absolute value of the correction factor decreases as the luminance of the pixel increases;

calculating, for each pixel in the image, a correction value corresponding to the pixel by multiplying the correction factor by the average luminance and dividing by a predetermined white level for a display having a fixed luminance dynamic range; and adding the correction value to the luminance.

17. The recording medium according to claim 16, the method further comprising:

setting the correction factor to zero when the luminance has a maximum value, and setting the correction factor to a negative value when the luminance has a minimum value.

18. The recording medium according to claim 16, the method further comprising:

calculating the correction value in proportion to the average luminance and the correction factor.

19. The recording medium according to claim 16, the method further comprising:

calculating the correction factor using a look-up table or function, setting the correction factor to zero when the luminance has a maximum value, and setting the correction factor to a negative value when the luminance has a minimum value.

20. The recording medium according to claim 16, the method further comprising:

setting the correction value to a maximum value of zero when the luminance has a maximum value.

* * * * *